United States Patent
Sears

(10) Patent No.: US 9,532,646 B2
(45) Date of Patent: Jan. 3, 2017

(54) SLIDABLE KEYBOARD SUPPORT

(71) Applicant: Michael John Sears, Dallas, TX (US)

(72) Inventor: Michael John Sears, Dallas, TX (US)

(73) Assignee: Ergotect Corporation, Dallas, TX (US)

( * ) Notice: Subject to any disclaimer, the term of this patent is extended or adjusted under 35 U.S.C. 154(b) by 696 days.

(21) Appl. No.: 13/938,708

(22) Filed: Jul. 10, 2013

(65) Prior Publication Data

US 2013/0292522 A1   Nov. 7, 2013

(51) Int. Cl.
| | | |
|---|---|---|
| A47B 21/03 | (2006.01) |
| F16M 13/02 | (2006.01) |
| F16M 11/08 | (2006.01) |
| F16M 11/20 | (2006.01) |
| F16M 11/24 | (2006.01) |
| G06F 1/16 | (2006.01) |
| G06F 3/02 | (2006.01) |

(52) U.S. Cl.
CPC ....... *A47B 21/0371* (2013.01); *A47B 21/0314* (2013.01); *F16M 11/08* (2013.01); *F16M 11/2014* (2013.01); *F16M 11/2092* (2013.01); *F16M 11/24* (2013.01); *F16M 13/022* (2013.01); *G06F 1/1669* (2013.01); *G06F 3/0219* (2013.01); *A47B 2021/0321* (2013.01); *F16M 2200/044* (2013.01)

(58) Field of Classification Search
CPC .. A47B 21/0314; A47B 21/00; Y10S 248/918
See application file for complete search history.

(56) References Cited

U.S. PATENT DOCUMENTS

| | | | |
|---|---|---|---|
| 4,732,089 A | 3/1988 | Mueller | |
| 5,655,743 A | 8/1997 | Gillis | |
| D392,956 S | 3/1998 | Gillis | |
| 5,755,410 A | 5/1998 | Ambrose et al. | |
| 5,771,814 A | 6/1998 | Clausen | |
| D410,453 S | 6/1999 | Timm | |
| 5,967,479 A | 10/1999 | Gonnerman et al. | |
| 6,148,739 A * | 11/2000 | Martin | A47B 21/0314 108/50.01 |
| 6,206,495 B1 | 3/2001 | Peterson | |
| 6,296,215 B1 | 10/2001 | McCoy et al. | |
| 6,384,812 B1 | 5/2002 | Dunn | |
| 6,497,391 B1 | 12/2002 | Timm | |
| 6,527,234 B1 | 3/2003 | Kovacik | |
| 6,637,350 B2 * | 10/2003 | McKsymick | A47B 21/00 108/25 |
| 6,682,038 B2 | 1/2004 | Golynsky | |
| 6,694,895 B2 | 2/2004 | Gillis | |

(Continued)

*Primary Examiner* — Bradley Duckworth
(74) *Attorney, Agent, or Firm* — Law Office of Sam Sokhansanj PLLC

(57) ABSTRACT

A user input device support apparatus is provided for supporting right or left handed users of a computer keyboard and mouse. The user input support apparatus includes a base configured to couple to a mobile or fixed mounting system. The keyboard support further includes a tray configured for supporting a user input device, such as a computer keyboard. Further, the tray includes a lip, wherein the lip is configured to at least partially engage the base. Here, the tray is further configured to slide with respect to the base, thereby accommodating right or left-handed users of the keyboard and a mouse.

20 Claims, 15 Drawing Sheets

(56) References Cited

U.S. PATENT DOCUMENTS

| | | | |
|---|---|---|---|
| 6,702,410 B2 * | 3/2004 | Kusztal | A47B 21/03 248/289.31 |
| 6,749,158 B2 | 6/2004 | Timm | |
| 6,798,399 B2 | 9/2004 | Hatanaka | |
| 6,799,816 B2 * | 10/2004 | Touzani | A47B 21/0314 108/93 |
| 6,808,328 B1 * | 10/2004 | Gully | G06F 3/0216 248/118 |
| 6,817,587 B2 * | 11/2004 | Lin | A47B 23/002 108/136 |
| 6,912,119 B2 | 6/2005 | Maloney | |
| D510,359 S | 10/2005 | Gillis | |
| 7,048,236 B2 * | 5/2006 | Benden | A47B 21/0314 108/138 |
| 7,086,634 B1 | 8/2006 | Kirchhoff | |
| 7,100,883 B2 * | 9/2006 | Ramey, III | A47B 19/06 248/442.2 |
| D588,145 S | 3/2009 | Benden et al. | |
| 7,677,518 B2 * | 3/2010 | Chouinard | A47B 21/02 108/10 |
| 7,752,981 B2 | 7/2010 | Blackburn | |
| 7,828,253 B2 | 11/2010 | Meyer | |
| D630,452 S | 1/2011 | Robbins et al. | |
| 7,862,111 B2 | 1/2011 | Steenson | |
| 8,109,527 B2 | 2/2012 | Bustle et al. | |
| 2005/0013102 A1 | 1/2005 | Poulsen | |
| 2009/0314913 A1 | 12/2009 | Gillis | |
| 2010/0127143 A1 * | 5/2010 | Karmazyn | A47B 21/0314 248/224.8 |
| 2010/0294177 A1 * | 11/2010 | Carney | A47B 23/04 108/137 |
| 2011/0235249 A1 * | 9/2011 | Bustle | A47B 21/0314 361/679.01 |
| 2012/0061546 A1 | 3/2012 | Hamilton | |

* cited by examiner 1412  1414          1416

1410a  1410b       1410c

SLIDABLE KEYBOARD SUPPORT

FIELD OF THE INVENTION

The invention is related to ergonomic computer equipment. More specifically, the invention is related to a device for supporting and selectively positioning a keyboard for right or left-handed users.

BACKGROUND

Personal computers are widely used by both right handed and left handed users universally at work and in the home. Two major input devices used with computer systems are its keyboard and mouse. Right-handed users will typically operate a mouse with the right hand, and a left-handed user will operate a mouse with the left hand. Hence, the mouse will need to be positioned either to the left or right of a keyboard depending on who is operating the keyboard and mouse. For ergonomic, accessibility, and mobility reasons, the keyboard and mouse can rest on an articulating, height adjustable, and pivoting mobile or fixed computer station which is in close proximity to a computer monitor or screen. Typically in office settings, the keyboard is resting on a flat keyboard surface that may tilt up to 20 degrees forward or backward. Such arrangements typically include a pad to create a friction and/or a lip as a physical obstruction that inhibits the keyboard from easily sliding off the keyboard surface. More recently, keyboard trays are being designed to rotate up to 90 degrees (closed or negative tilt) when not in use to increase usable space in various work environments or where ergonomic realities define the need for compact work envelopes. Additionally, there is a recognized need and deployment of keyboards and input devices to be available at angles greater than 20 degrees open (positive tilt means the space bar or front of the computer is lower than the back) for users interfacing in more recumbent postures.

With the advent of vertical stowage and use of keyboards, various solutions have been devised to secure both keyboard and mouse. Physical clamps that press against the edges of keyboards, elevated tray edges or lips, hook and loop fasteners, and double sided sticky tapes are typical solutions seen today to prevent the keyboard from moving around or sliding off the tray. Fixed, position-able and mobile computer workstations in hospitals, retail, or industrial environments, will have various right or left-handed individuals using the same keyboard and that will require immediate access to the appropriate left or right handed orientation of keyboard and mouse. However, these stations do not easily accommodate both right and left-handed users.

Further, when utilized in environments where infection control (IC) considerations are critical, these computer stations and their keyboards and mice need to be clean and sanitary to prevent the risk of infections or disease passing between various individuals. In addition, the keyboards and mice need to be easily removed and re-attached to these stations for cleaning and sanitization. Although there are existing keyboard and mouse supports that allow for flexibility in positioning the keyboard and/or mouse to suit a user's ergonomic requirements, none of the prior art keyboard and mouse supports of which the inventor is aware of disclose a device where the keyboard, while being securely fixed to a tray, can be slid in a sideways or lateral direction in order to accommodate left or right side positioning of the mouse, thereby easily accommodating both right or left-handed user. Further, none of the prior art discloses a method of securely fixing the keyboard to the tray and easily removing and re-attaching it while maintaining sanitary conditions and wherein the components can be sanitized and cleaned. Hence, there is a need for a keyboard support apparatus that overcomes the shortcomings of the prior art.

BRIEF SUMMARY OF THE INVENTION

In one aspect of the invention, a keyboard support apparatus is provided having a base configured to couple to a mobile or fixed mounting system. The keyboard support further includes a tray configured for supporting a user input device, such as a computer keyboard. Further, the tray includes a lip, wherein the lip is configured to at least partially engage the base. Here, the tray is further configured to slide with respect to the base.

The above summary is not intended to describe each and every disclosed embodiment or every implementation of the disclosure. The Description that follows more particularly exemplifies the various illustrative embodiments.

DETAILED DESCRIPTION

The present invention can be understood more readily by reference to the following detailed description, examples, drawing, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

Figure 1:
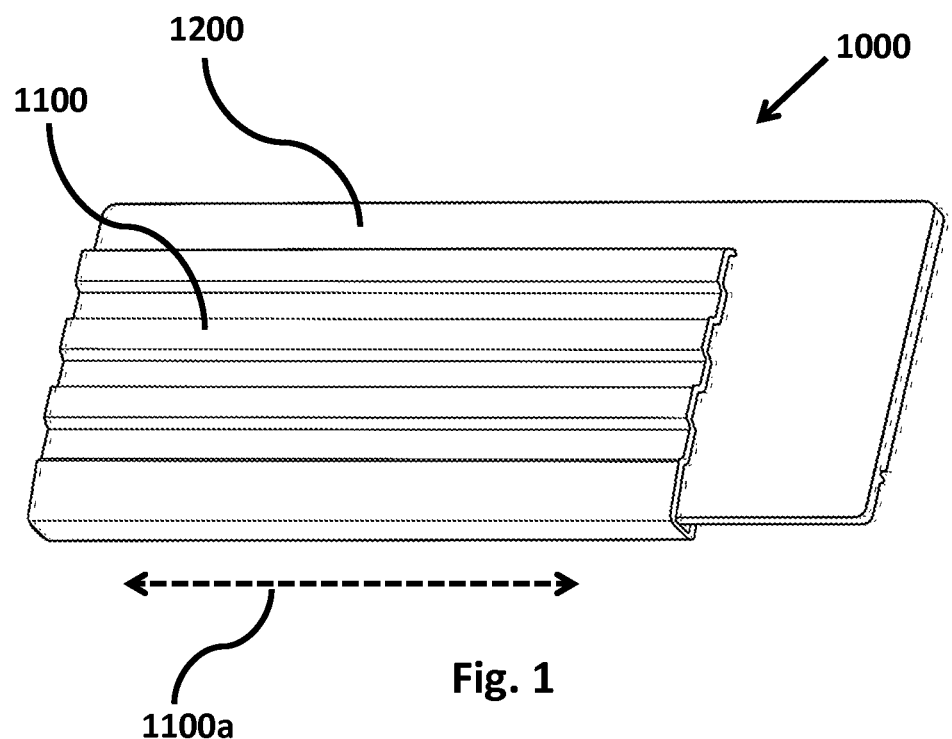
FIG. 1 illustrates one embodiment of a perspective top view the keyboard support without a keyboard or mouse.
Figure 2:
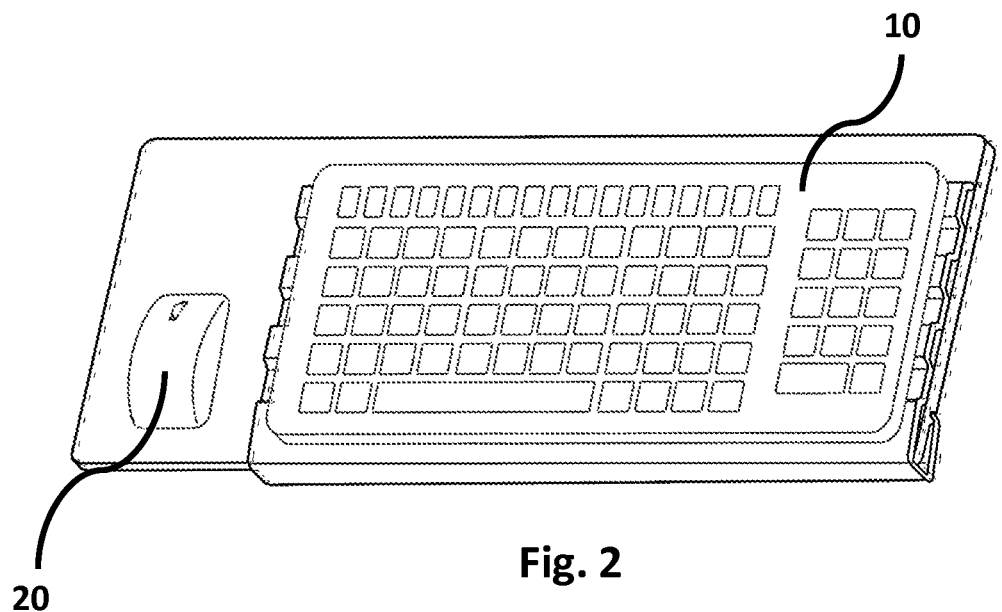
FIG. 2 illustrates a perspective top view of the keyboard support of FIG. 1 with a keyboard and mouse.
Figure 3:
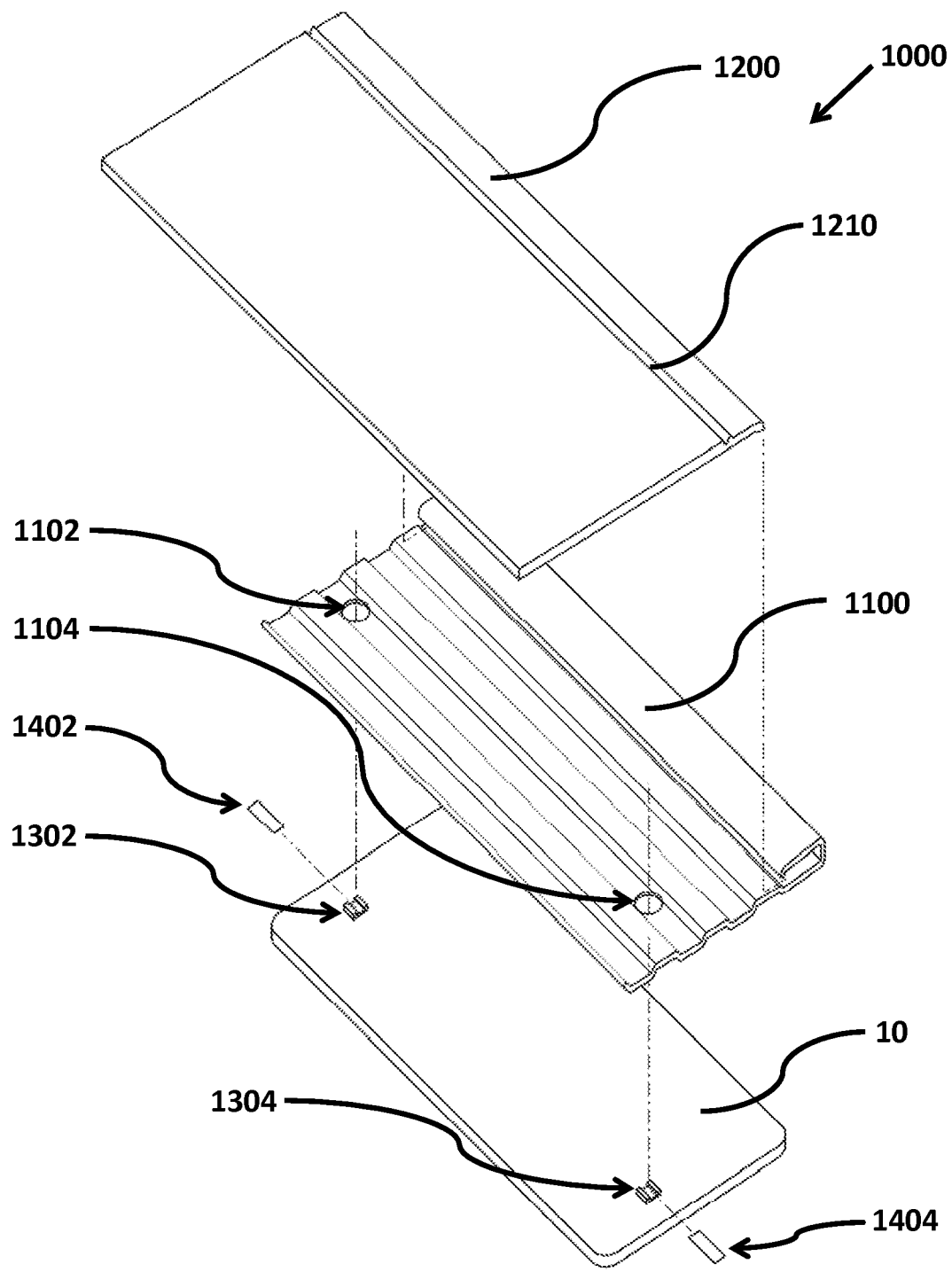
FIG. 3 illustrates an exploded bottom perspective view of the keyboard support of FIG. 1 and related components.

FIGS. 1-3 illustrate one embodiment of keyboard support 1000, which is shown including a tray 1100 and base 1200. Tray 1100 is adapted to support a computer keyboard 10 and base 1200 is adapted to support a computer mouse 20. However, it is contemplated within the scope of the invention that base 1200 and tray 1100 can support any number of devices, such as a mouse, musical keyboard, touch screen interface, haptic feedback interface, monitor display, motion tracking interface, and eye gaze interface. In addition, tray 1100 is configured to slide to the left or right with respect to base 1200. Here, the sliding configuration of tray 1100 is configured to accommodate either a left or right-handed user. For example, if a left-handed user is operating the keyboard, then the user will collectively slide keyboard 10 and tray 1100 to the right and place the mouse to the left of the tray on base 1200, as shown in FIG. 2. Vice versa, if a right-handed user is operating the keyboard, then the user will collectively slide keyboard 10 and tray 1100 to the left and place the mouse to the right of tray on base 1200. In the current embodiment, tray 1100 can be approximately 18 inches in length and 8 inches in width. Base 1200 can be approximately 26 inches in length and 8.5 inches in width. However, it is contemplated within the scope of the invention that either of tray 1100 or base 1200 can be of any length, dimension, shape, or configuration, including but not limited to the following configurations: rectilinear, square, parallelogram, trapezoid, rhomboid, and asymmetrical. In addition, in another embodiment, tray 1100 may further support both a keyboard and a mouse, or a plurality of the aforementioned user input devices.

In the current embodiment, tray 1100 is a molded unitary component made of acrylonitrile butadiene styrene (ABS) thermoplastic and base 1100 is an extruded unitary component made of aluminum. However, it is contemplated within the scope of the invention that either tray 1100 can be comprised of two or more pieces integrated, coupled, or fused together, and base 1200 can be comprised of two or more pieces integrated, coupled, or fused together. In addition, it is contemplated within the scope of the invention that either tray 1100 or base 1200, or both, comprised of one or more of the following materials: plastics, thermoplastics, thermosetting polymers, polyethylene terephthalate, high-density polyethylene, polyvinyl chloride, polypropylene, polystyrene, polycarbonate, polylactide, fiberglass, glass-reinforced plastic, epoxy derived, polyester derived, aluminum, steel, or from any metal or alloy derived materials, ruthenium, rhenium, rubidium, scandium, silver, strontium, tantalum, tellurium, tin, titanium, tungsten vanadium, zinc, and zirconium.

FIG. 3 illustrates an exploded view of the keyboard support 1000. Base 1200 further includes a recessed slot or channel 1210 that extends the length of base 1200. However, it is contemplated within the scope of the invention that channel 1210 can be of any length, depth, size, radius, diameter, or configuration. Channel 1210 is configured to engage and secure tray 1100 with respect to the base. Tray 1100 further includes apertures 1102 and 1004, which will later be described in detail. In addition, keyboard 10 has tab insert receivers 1302 and 1304 fixed to the underside or bottom surface of keyboard 10. Tab insert receivers 1302 and 1304 are configured to receive and hold tab inserts 1402 and 1404, respectively. In the current embodiment, tab receivers 1302 and 1304 are affixed or secured via an adhesive to the underside of the keyboard, however, in other embodiments, they can be fixed via one or more rivets, screws, bolt, latch, press-fit, or snap fit. In addition, it is contemplated within the scope of the invention that any number of tab receivers and apertures can be used. Here, tab receivers 1302 and 1304 are shaped in a U-like configuration that allows them to receive, securely engage, and hold tabs 1402 and 1404. More specifically, the receivers have a base portion with two upstanding walls that are substantially perpendicular to the base, wherein the walls form flanges or feet at their terminating ends, thereby creating a semi-open channel or conduit within the receivers. The channel or conduit created by the base and walls has a substantially rectilinear configuration. However, it is contemplated within the scope of the invention that the tab receiver can be a closed conduit or channel, wherein the channel opening can be of any configuration, such as circular, oval, ellipsoid, rectangular, triangular, or any polygon having three or more sides.

Figure 4A:
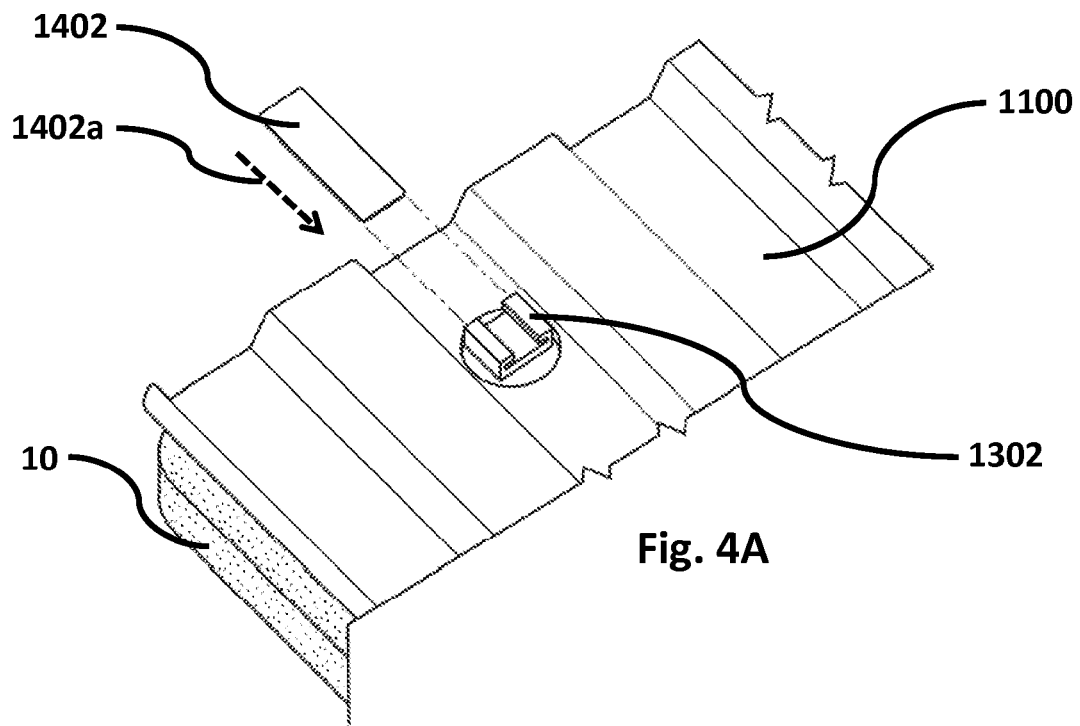
FIG. 4A illustrates an exploded perspective view of a locking mechanism of the keyboard support of FIG. 1 in one embodiment, illustrating a tab prior to insertion.
Figure 4B:
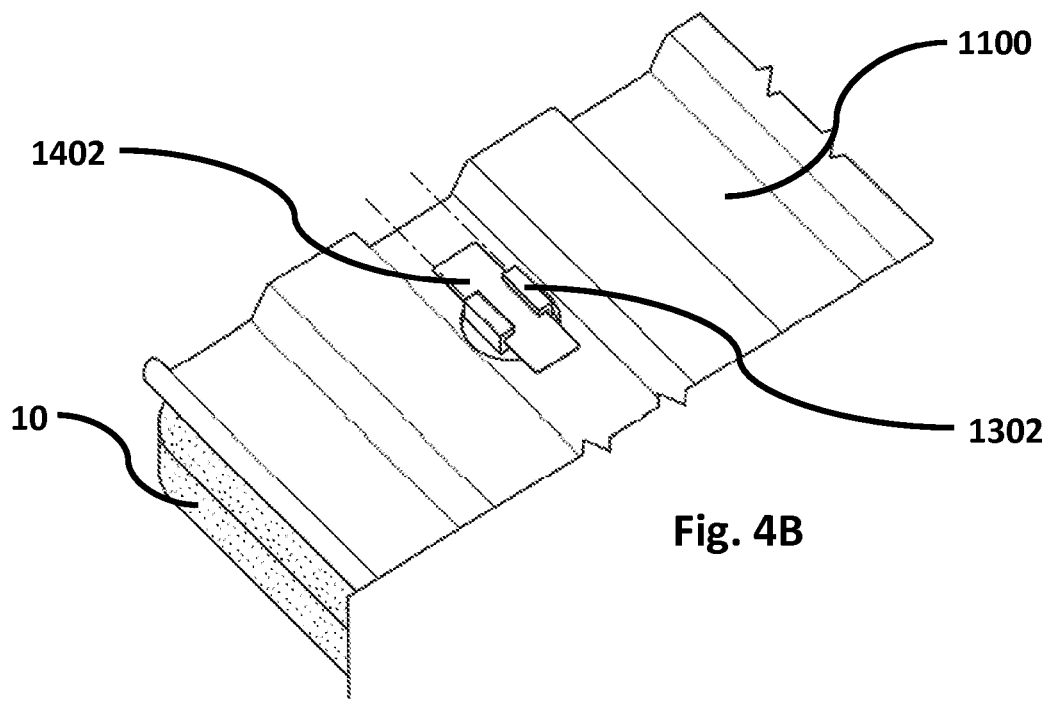
FIG. 4B illustrates an exploded perspective view of the locking mechanism of FIG. 4A with the tab inserted.

Referring now to FIGS. 3, 4A, and 4B, a method of assembling the keyboard support apparatus will now be described. However, it is contemplated within the scope of the invention that the following method can be performed in any order or sequence:

1) Tab receivers 1302 and 1304 are fixed to the underside of keyboard 10;

2) Tray 1100 is then placed on top of the underside surface of keyboard 10, wherein apertures 1102 and 1104 are aligned with tab receivers 1302 and 1304, respectively, as shown in FIG. 3.

3) Tab inserts 1402 and 1404 are then inserted within tab receivers 1302 and 1304, wherein the tabs securely fix the keyboard 10 to tray 1100. More specifically, the front and tail ends of tabs 1402 and 1404 at least partially push or press against the surface of the tray, thereby providing a secure engagement of the keyboard with respect to the tray 1100. FIGS. 4A and 4B illustrate a close-up of tab 1402 is inserted within tab receiver 1302 via dashed line 1402*a*, although it can be inserted any way or from any direction desired. Although not illustrated in FIGS. 4A and 4B, the foregoing insertion method is also performed for tab 1404 with respect to tab receiver 1304.

Further, tray 1100 and base 1200 can be assembled together by inserting sliding tray 1100 from the left or the right sides of base 1200 and sliding the tray into the desired position. More specifically, referring to FIG. 6B, a user can align lip 1152 of the tray with channel 1210 of the base on either the left or ride side of the base and insert the tray on to the base. Alternatively, a user can assembly tray 1100 with base 1200 by snapping the tray into place. Specifically, a user can align the top of base 1200 with a portion of the underside surface of tray 1100 and slide the tray into place from either the top or bottom end of base 1200, which will be the end proximal to channel 1210. More specifically, the sliding of the tray onto the base will allow the J-shaped lip area of the tray to snap into place with the base, wherein the snapping referred to here is the action of the lip 1152 pressing against and over protrusion 1220, and thereby falling into place within channel 1210. Further, it is contemplated within the scope of the invention that the male/female fitting of parts, 1220, 1152, and 1210 can be arranged in a reverse configuration with respect to the tray and base. Specifically, in another embodiment, the tray can include a channel similar to channel 1210 and a protrusion similar to protrusion 1220, and the base can include a lip or protrusion similar to lip 1152.

Tabs inserts 1402 or 1404 are shaped in a rectangular configuration. However, it is contemplated within the scope of the invention that either one or more of the tabs can take the shape of a parallelogram, spear, arrow, or asymmetrical configuration. Further, their cross-section can be rectilinear, circular, oval, ellipsoid, cylindrical, or any polygon having three or more sides. In the current embodiment, the tabs are constructed of plastic or thermoplastic material that is at least partially flexible and resilient. However, it is contemplated within the scope of the invention that the tabs can be of any material, including but not limited to polycarbonate derived, fiberglass derived, or metal derived materials. In addition, the tabs can be substantially rigid or substantially flexible. Further, the tabs can also include any number of notches and grooves to assist in providing a secure engagement.

Figure 5A:
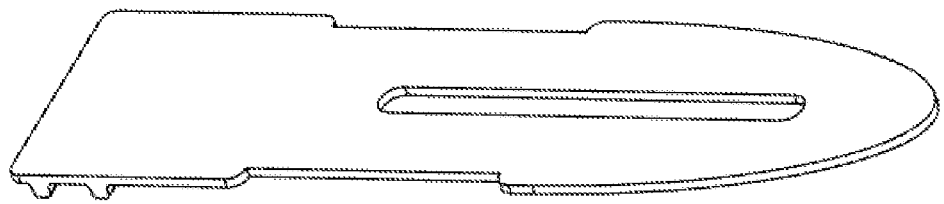
FIG. 5A illustrates a perspective top view of a tab in one embodiment.
Figure 5B:
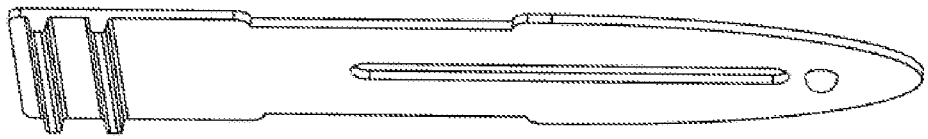
FIG. 5B illustrates a perspective bottom view of the tab of FIG. 5A.
Figure 5C:
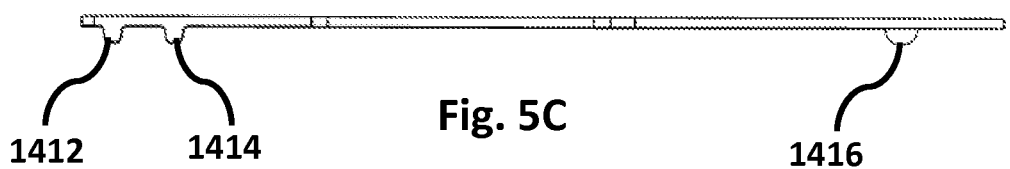
FIG. 5C illustrates a side view of the tab of FIG. 5A.
Figure 5D:
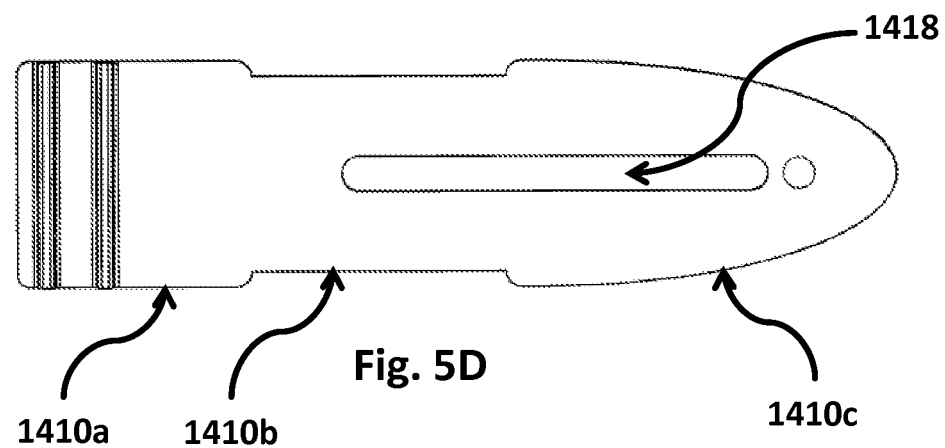
FIG. 5D illustrates a bottom view of the tab of FIG. 5A.

FIGS. 5A-5D, illustrate another embodiment for a tab insert that is configured as an arrow or spearhead like configuration. More specifically, as shown in FIGS. 5A and 5D, the head portion 1410*c* of the tab has an arrow, spear, or pointed like configuration. Middle area 1410*b* is slightly tapered in width in relation to the head portion 1410*c* or tail portion 1410*a*. On one surface of the tab, head portion 1410*c* includes a half-sphere protrusion or dimple 1416 and tail portion 1410*a* includes two elongated protrusions or ridges 1412 and 1414 that are substantially parallel to each other. Further, the tab includes in an open elongated cutout or open slot 1418 located approximately within the area of the head and tail. The combination of the head 1410*c*, middle 1410*b*, and tail 1410*a* configuration along with the dimple 1416, ridges 1412 and 1414, and slot 1418 allow the tab to be easily inserted within a tab receiver, firmly engaged within the receiver, and easily removed from the receiver.

It is commonplace in many environments, such as in a hospital environment, for computer keyboards and other user input devices to be sanitized and cleaned on a routine basis. The tab and tab receiver assembly in the aforementioned embodiments, allow a user to easily couple the keyboard and/or remove it from the tray and base assembly via the tab inserts. In addition, the tab inserts can be either disposable or re-usable items. However, it is contemplated within the scope of the invention, in lieu of using the aforementioned tab insert and tab receiver securement mechanism, any other type of securing mechanism or method can be incorporated. For example, in other embodiments, the mechanism or method used to secure the keyboard to the tray (hereinafter known as "securement mechanism") can include, but is not limited to hook and loop material, glue, adhesive, fasteners, snap-fit, press-fit, screw, nut and bolt, rivets, nail, latch, strap, buckle, clip, lock, key, cable, weld, soldered, fused, seam, and dove-tail engagement.

Figure 6A:
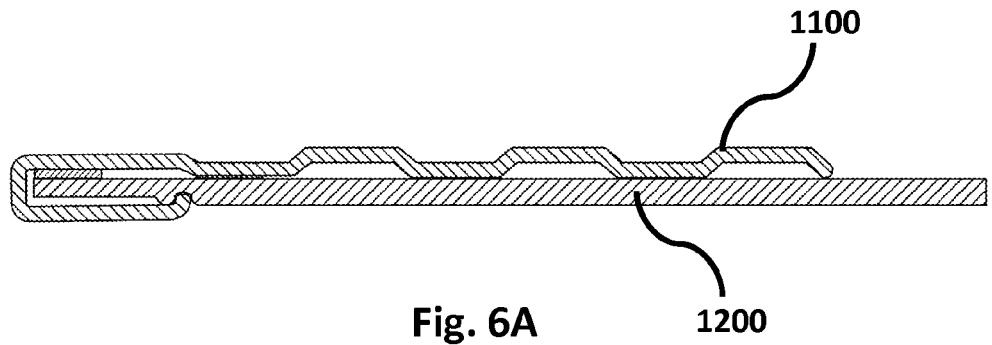
FIG. 6A illustrates a cross-sectional view of the keyboard support of FIG. 1.

FIG. 6A illustrates a cross-sectional view of tray 1100 and base 1200 as assembled. FIG. 6C illustrates a cross sectional view of the tray 1100, base 1200, and tab receiver 1304, and keyboard 10 as assembled. As shown in the current embodiment, tray 1100 has a plurality of ridges and troughs forming a wave pattern. The ridges and troughs have flattened top and bottom surfaces, wherein the ridges of tray 1100 can at least partially in contact with the keyboard and the troughs can at least partially be in contact with base 1200. Further, the ridges provide an elevated space in the area underneath for the tab inserts and tab receivers to fall within, thereby accommodating the protrusions from the tab inserts and receivers. FIG. 6A illustrates a close-up view of the lip area of tray 1100 and base 1200. More specifically, tray 1100 forms a J-shape or hook-like configured lip area 1150 that generally wraps around one end of base 1200 and partially extends to an underside region of base 1200 thereby securing the tray to the base. Here, tray 1100 includes slide assist agents 1120 and 1110 fixed thereon, such as ultra-high-molecular-weight polyethylene (UHMW) tape, positioned between the tray and base. It is contemplated within the scope of the invention that the keyboard support may include any number of slide assist agents. Slide assist agents 1120 provide an anti-friction surface or a reduced friction surface to facilitate the sliding of the tray relative to the base. Alternatively, the slide assist agents can be fixed to base 1200. Further, the slide assist agents are not limited to UHMW tape, and can be of any size, shape, or dimension and include one or more of the following: high-modulus polyethylene (HMPE), and high-performance polyethylene (HPPE), polycarbonate based, polymer based, polyethylene based, bearings, ball bearings, roller bearings, magnetic bearings, rotary bearings, linear bearings, magnets, gears, spur gears, worm gears, helical gears, herringbone gears, bevel/miter gears, internal gears, rack and pinion, face gears, involute splines, straight solid splines, sprockets, grease, and oil based substances.

Figure 6B:
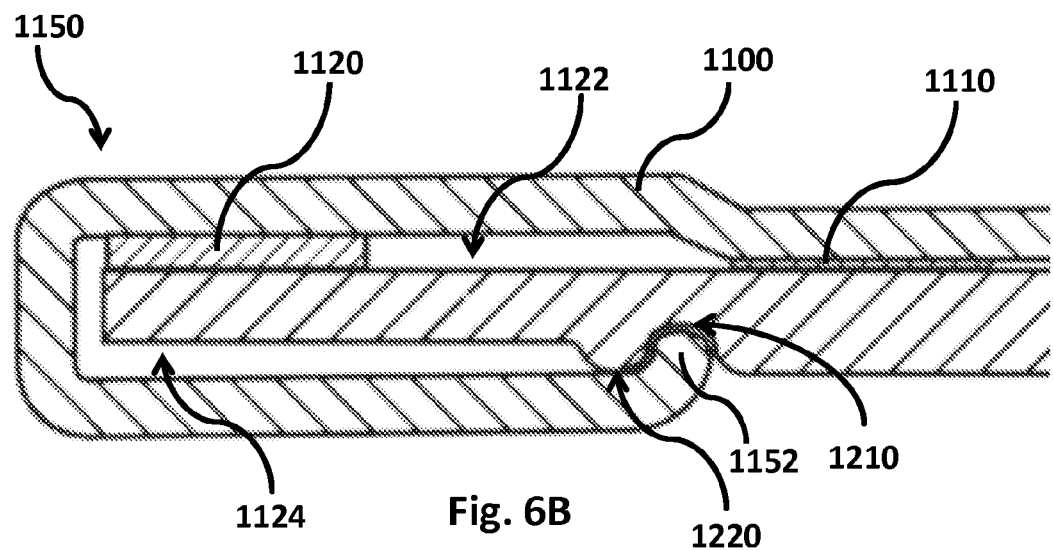
FIG. 6B illustrates a close-up cross-sectional view of the lip area of the keyboard support of FIG. 6A.
Figure 6C:
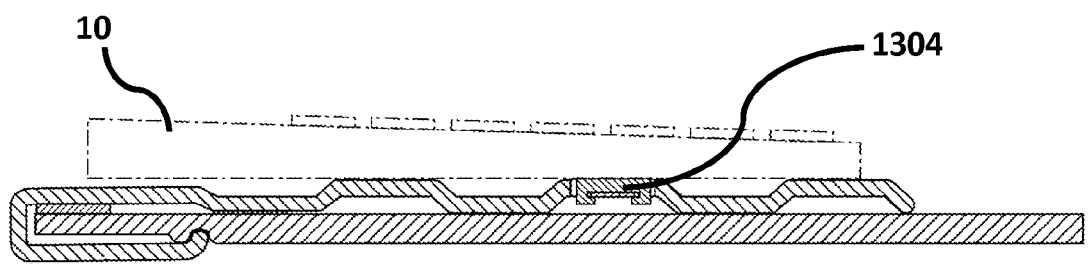
FIG. 6C illustrates a cross-sectional view of the keyboard support of FIG. 6A with a keyboard secured to the support.

Still referring to FIG. 6B, slide agents 1120 and 1110 slightly raise the elevation of tray 1100 with respect to the base, thereby at least partially preventing the tray from being in substantial direct contact with the base thus providing improving the sliding capability of the tray. Specifically, the elevation of the tray with respect to the base creates creating open spaces 1122 and 1124. In this embodiment, at the end of lip area 1150 there is a slightly upward protrusion or lip 1152 that extends the full length of the tray. Specifically, elongated protrusion 1152 has a semi-circular end that fits within the channel 1210 of base 1200 allowing the tray to slide within channel 1210. Specifically, protrusion 1152 and channel 1210 have a complementary engagement with respect to each other. Generally, channel 1210 provides a raceway or track that facilitates the sliding of the tray. In addition, base 1200 also includes an elongated protrusion or ridge 1220 that extends the full length of the base, wherein the outer surface of 1220 engages the inner surface of protrusion 1152, thereby securely attaching the tray and base. The combination of protrusion 1152, channel 1210, and ridge 1220 help prevent the tray from easily detaching from the base under normal use conditions, but can also allow the tray to be easily attached to and/or removed from the base when necessary, such as for cleaning purposes. In addition, either of the surfaces of 1152 or 1210, or both, can include one or more slide assist agents.

Figure 7A:
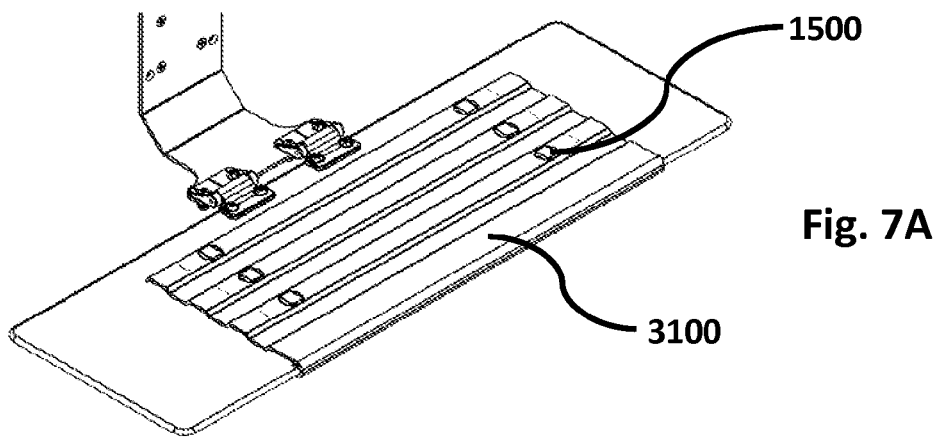
FIG. 7A illustrates a perspective top view of another embodiment for the keyboard support.
Figure 7B:
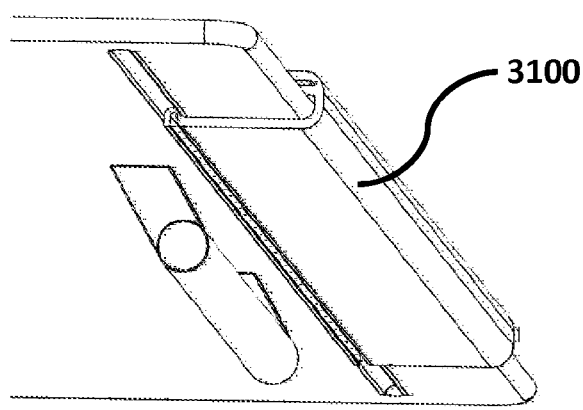
FIG. 7B illustrates a perspective bottom view of the keyboard support of FIG. 7A.
Figure 7C:
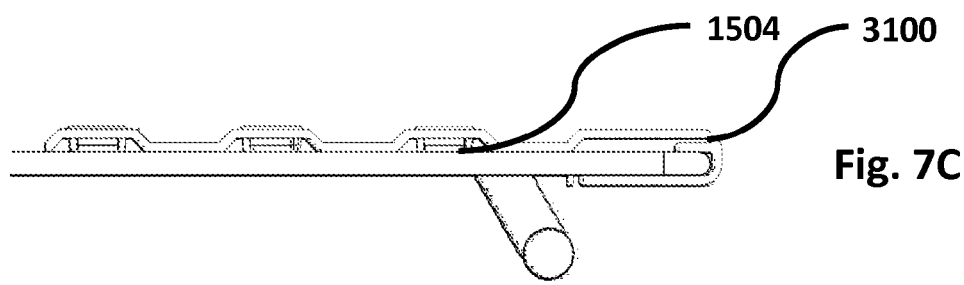
FIG. 7C illustrates a side view of the keyboard support of FIG. 7A.
Figure 7D:
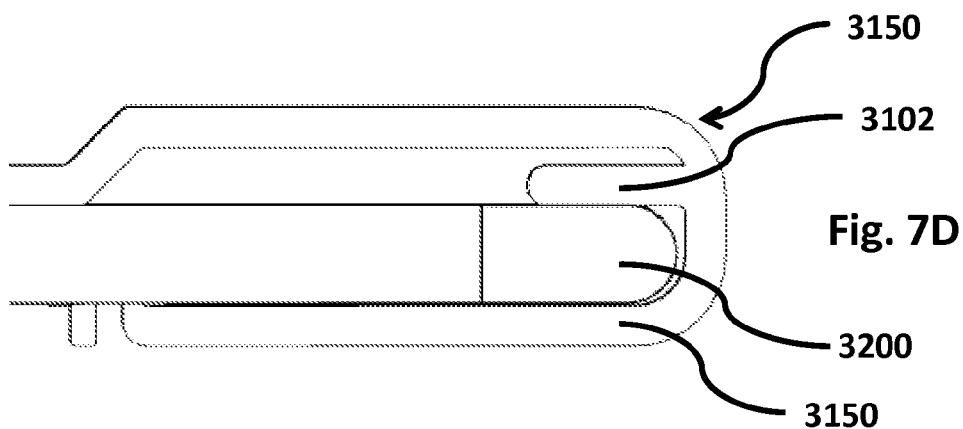
FIG. 7D illustrates a close-up side view of the lip area of the keyboard support of FIG. 7A.
Figure 8A:
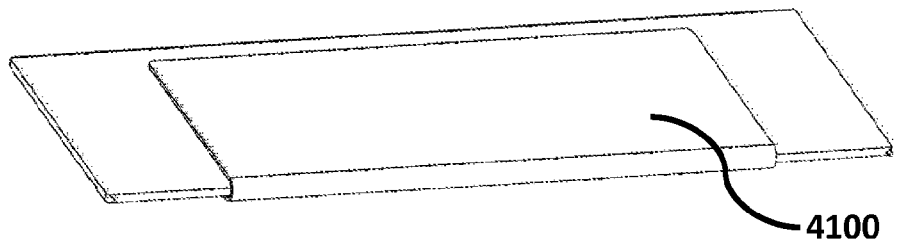
FIG. 8A illustrates a perspective top view of another embodiment for the keyboard support.
Figure 8B:
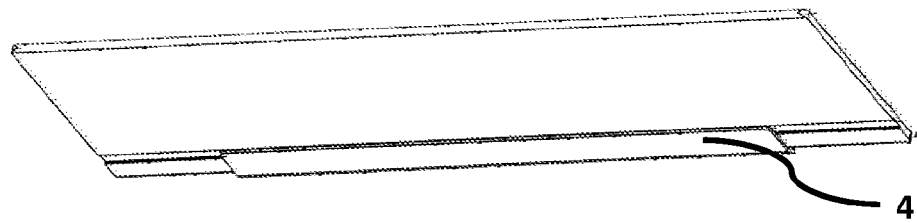
FIG. 8B illustrates a perspective bottom view of the keyboard support of FIG. 8A.
Figure 8C:
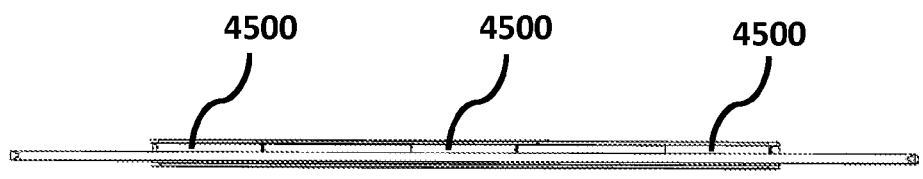
FIG. 8C illustrates a frontal view of the keyboard support of FIG. 8A.
Figure 8D:
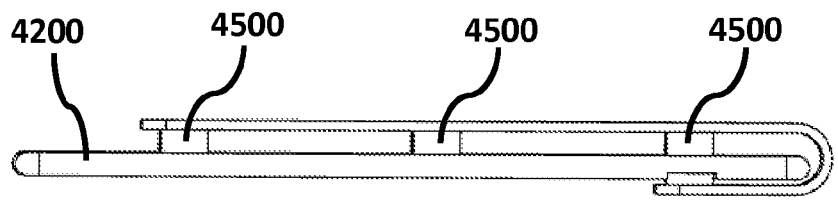
FIG. 8D illustrates a side view of the keyboard support of FIG. 8A.
Figure 8E:
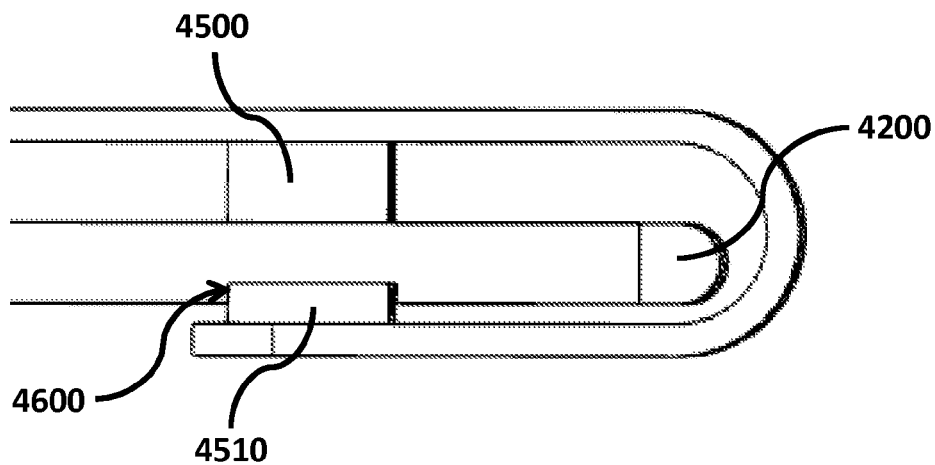
FIG. 8E illustrates a close-up side view of the lip area of the keyboard support of FIG. 8A.

FIGS. 7A-7D illustrate another embodiment for a tray. In this embodiment, tray 3100 can include one or more securement mechanisms 1500, to secure the keyboard to the tray. FIG. 7D illustrates a close up view of a lip area 3150 of the tray. In this embodiment, lip area 3150 forms a J-shape or hook like configuration having a protrusion or flange 3102 that extends within the inner middle area of lip 3150. Specifically, flange 3102 and area 3150 form an elongated channel for the end surface of base 3200 to fall within. In addition, either the bottom surface of 3102 or top surface of 3150, or both, can include slide assist agents. Similar to the embodiment disclosed in FIG. 6B, the embodiment in FIG. 7A-7D also includes a elongated channel and ridge on the base and a protrusion on the tray for engaging the base, thereby allowing the tray to slide with respect to the base and further securing the tray to the base.

FIGS. 8A-8E illustrate another embodiment of the tray. In this embodiment, tray 4100 has a flat horizontal top and bottom surface. Further, tray 4100 has a plurality of slide assist agents disposed between tray 4100 and base 4200. In addition, the slide agents create a space between the bottom surface of the tray and top surface of the base to further reduce friction and improve sliding capability. In this embodiment, tray 4100 a J-shape or hook-like lip area that wraps around and under base 4200. The end of the lip area of tray 4100 includes a rectilinear shaped elongated protrusion 4510, which can be a slide assist agent, that falls within an elongated channel or groove 4600 of base 4200. Further, protrusion 4510 and channel 4600 can have a reverse male and female fitting. In addition, protrusion 4510 can be either in a tight fitting or loose fitting relationship with channel 4600. The combination of the slide assist agents, the tray and its protrusion, and the base and its channel allow the tray to slide with respect to the base and further secure the tray to the base.

Figure 9A:
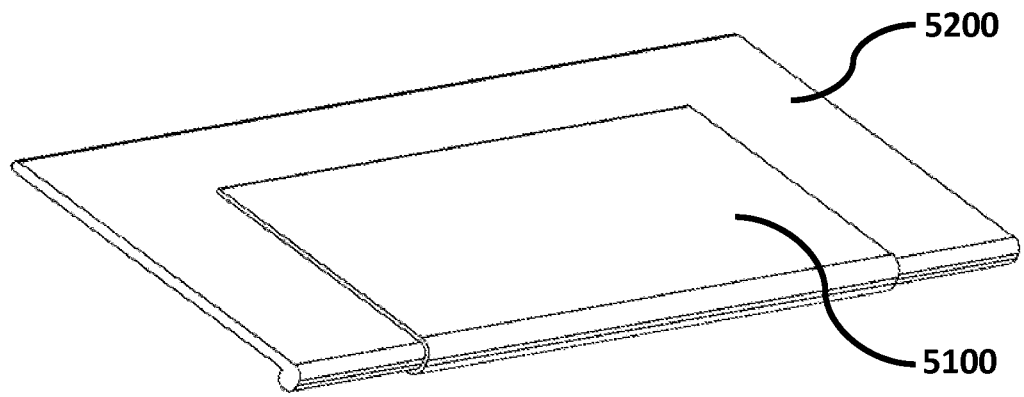
FIG. 9A illustrates a top perspective view of another embodiment of the keyboard support.
Figure 9B:
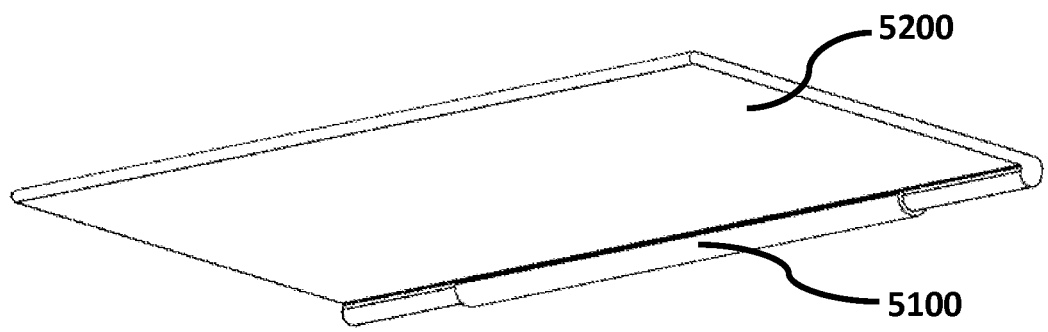
FIG. 9B illustrates a bottom perspective view of the keyboard support of FIG. 9A.
Figure 9C:
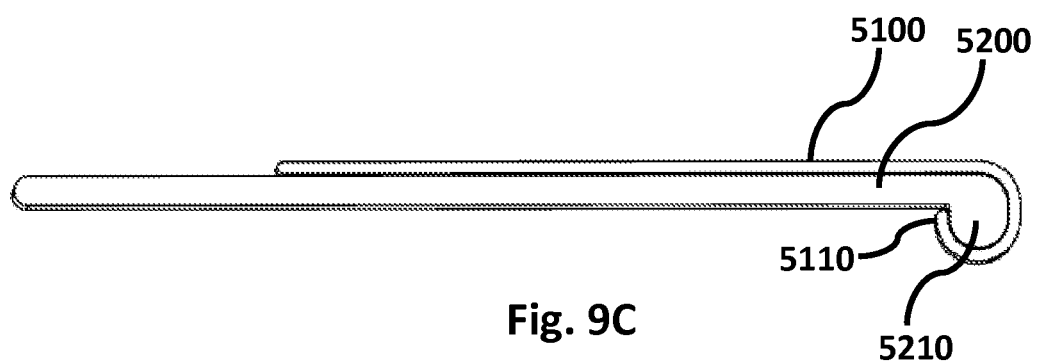
FIG. 9C illustrates a side view of the keyboard support of FIG. 9A.

FIGS. 9A-9C illustrate another embodiment of the tray and base. In this embodiment, tray 5100 has a flat horizontal top and bottom surface and a lip area for coupling with the base. Specifically, tray 5100 includes a J-hook configured lip area 5110 that wraps around and envelopes end 5210 of base 5200. End 5210 is an elongated protrusion or ridge having an at least partially semi-circular cross section that extends the length of the base. Here, end 5210 and protrusion lip area 5110 are in complementary engagement with respect each other. In addition, either of tray 5100 or base 5200, or both can include one or more slide assist agents to facilitate sliding of the tray with respect to the base. Here, the combination of the tray and its J-hook lip area and the base with its elongated projection allow the tray to slide with respect to the base and further help secure the tray to the base.

Figure 10A:
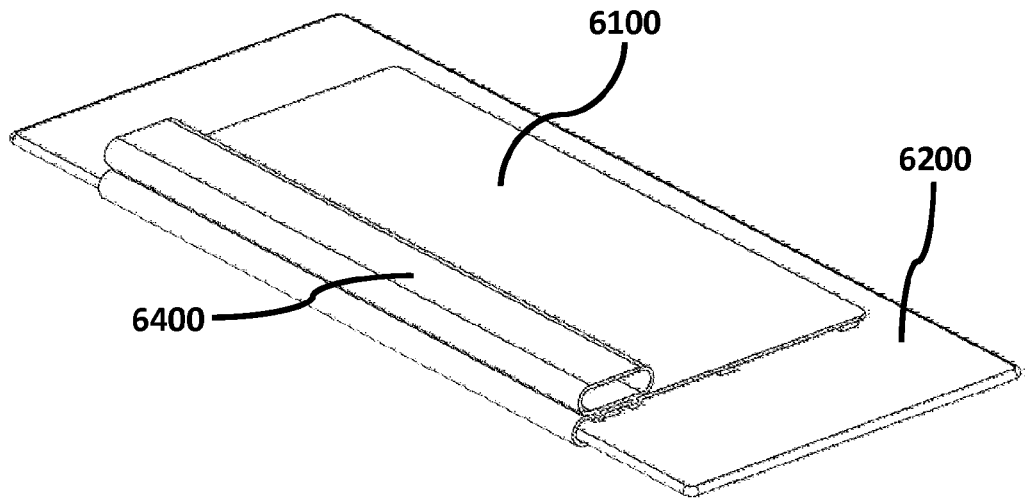
FIG. 10A illustrates a perspective top view of another embodiment of the keyboard support including a palm rest.
Figure 10B:
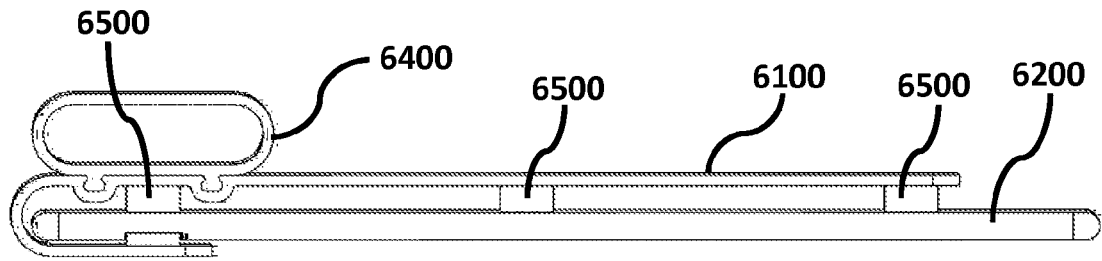
FIG. 10B illustrates a side view of the keyboard support of FIG. 10A.
Figure 10C:
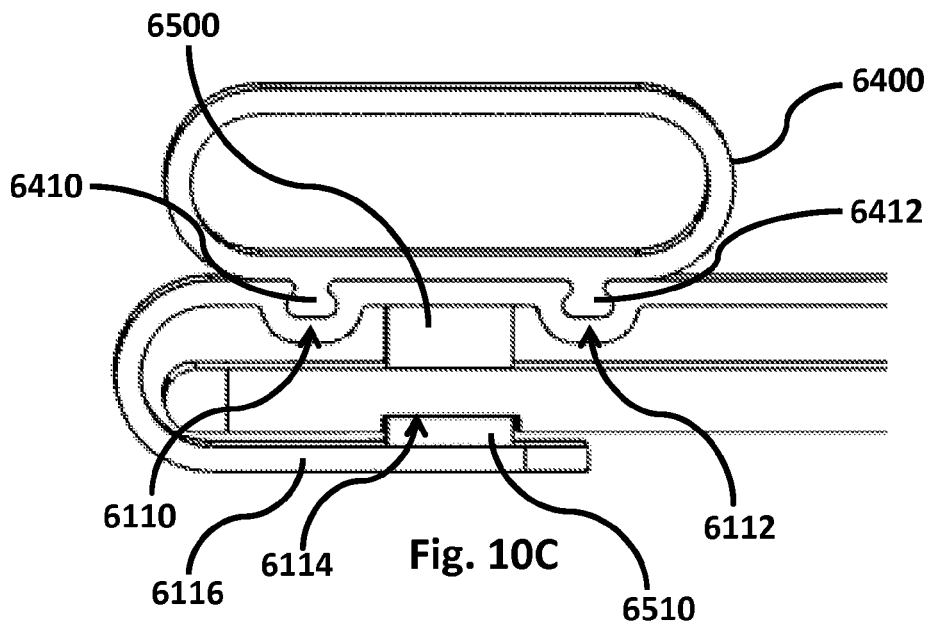
FIG. 10C illustrates a close-up side view of the keyboard support of FIG. 10A.

FIGS. 10A-10C illustrate another embodiment of a keyboard support. Here, tray 6100 has a flat horizontal top and bottom surface that further includes an attachable or detachable palm rest 6400. Tray 6100 further includes a plurality of slide assist agents 6500 disposed between tray 6100 and base 6200 to facilitate sliding of the tray with respect to the base. In addition, tray 6100 includes recessed channels 6110 and 6112 that engage and secure protrusions 6410 and 6410. Here, channels 6110 and 6112 extend the length of the tray and protrusions 6410 further extend the length of palm rest 6400, wherein channels 6110 and 6112 are in complementary engagement with protrusions 6410 and 6412. This configuration allows palm rest 6400 to be easily removed and re-attached when necessary, by sliding palm rest in or out or out of the tray, via the configuration of 6410, 6412, 6110, and 6112. It is contemplated within the scope of the invention that other types of devices or methods can be used to secure the palm rest to the tray in lieu of 6410, 6412, 6110, and 6112, such as hook and loop material, glue, adhesive, fasteners, snap-fit, press-fit, screw, nut and bolt, rivets, nail, latch, strap, buckle, clip, lock, key, cable, weld, soldered, fused, seam, and dove-tail engagement. Further, it is contemplated within the scope of the invention that any type of cushion or padding can also be incorporated on the outer surface of palm rest 6400. Alternatively, palm rest 6400 can be substantially comprised of cushion, padded, gelled, non-unitary, flexible material or can be a non-unitary component with respect to the tray and as an integrated/add-on component to the tray. Still referring to FIGS. 10A-10C, the end portion of lip area 6116 of tray 6100 includes a rectilinear elongated protrusion 6510 that falls within an elongated channel or groove 6114 of base 6200. Alternatively, protrusion 6510 may be a slide assist agent. Here, the combination of the slide assist agents, the tray and its protrusion, and the base and its channel allow the tray to slide with respect to the base and further help secure the tray to the base.

Figure 11A:
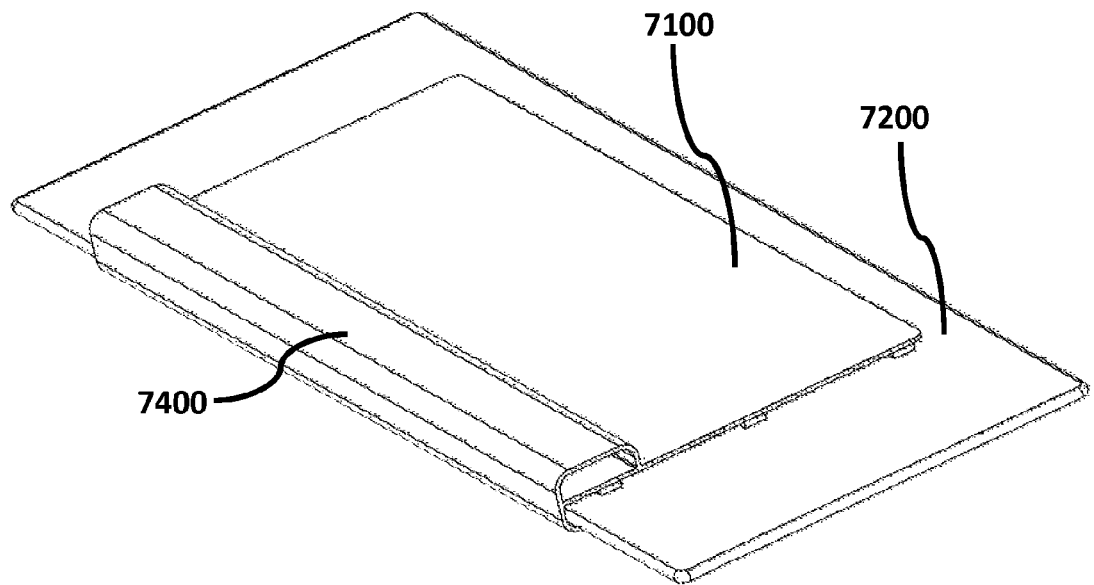
FIG. 11A illustrates a perspective top view of another embodiment of the keyboard support including a palm rest.
Figure 11B:
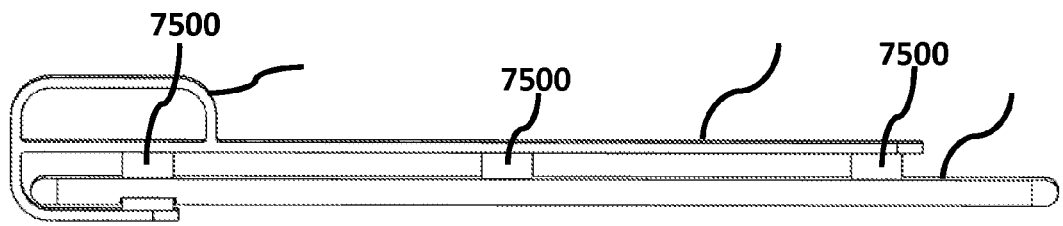
FIG. 11B illustrates a side view of the keyboard support of FIG. 11A.
Figure 11C:
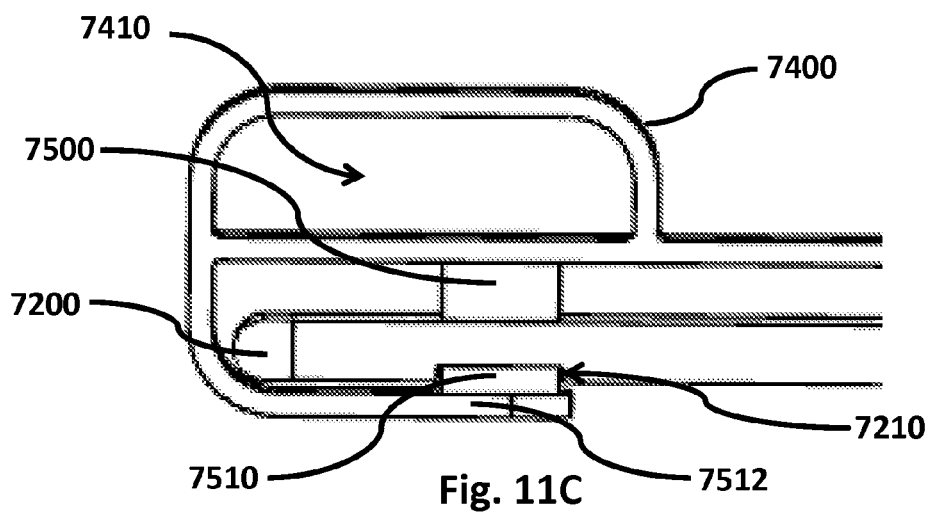
FIG. 11C illustrates a close-up side view of the keyboard support of FIG. 11A.

FIGS. 11A-11C illustrate another embodiment of the keyboard support apparatus. Here, tray 7100 has a flat horizontal top and bottom surface that further includes a palm rest 7400 integrated into the tray. Tray 7100 further includes a plurality of slide assist agents 7500 disposed between tray 7100 and base 7200 to facilitate sliding of the tray with respect to the base. In this embodiment, tray 7100 and palm rest 7400 are molded as one unitary component. Further, the configuration of palm rest 7400 creates an open space 7410. It is contemplated within the scope of the invention that any type of cushion or padding can also be incorporated on the outer surface of palm rest 7400. Alternatively, palm rest 6400 can be substantially comprised of cushion, padded, gelled, flexible material or can be a non-unitary component with respect to the tray and as an integrated/add-on component to the tray. Still referring to FIGS. 11A-11C, the end portion of lip area 7512 of tray 7100 includes a rectilinear elongated protrusion 7510 that falls within an elongated channel or groove 7210 of base 7200. Alternatively, protrusion 7510 may be a slide assist agent. Here, the combination of the slide assist agents, the tray and its protrusion, and the base and its channel allow the tray to slide with respect to the base and further help secure the tray to the base.

Figure 12A:
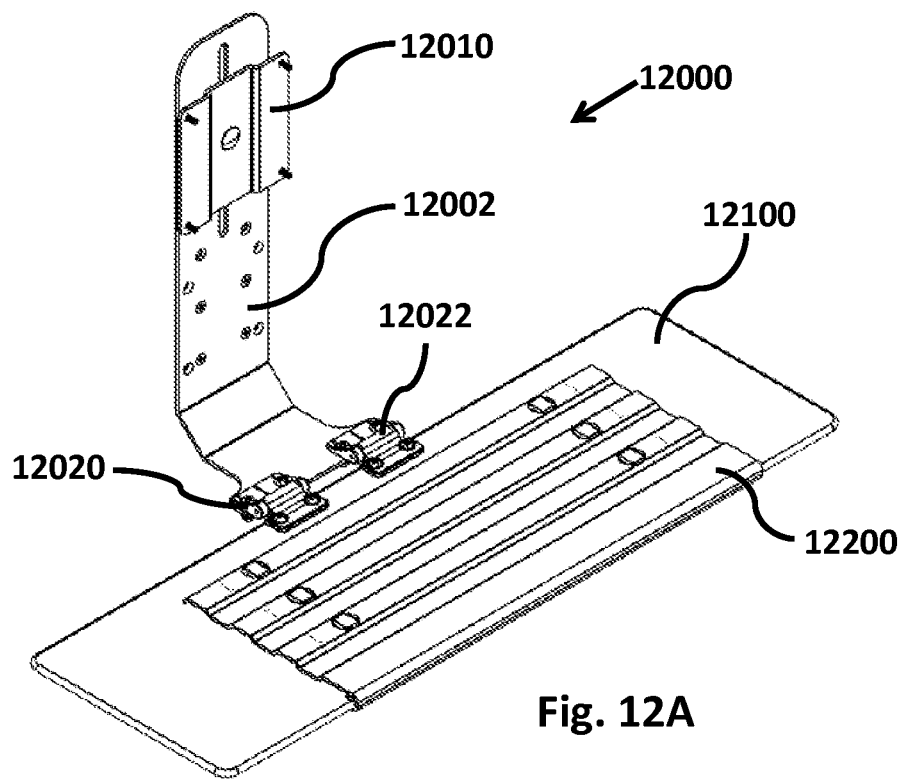
FIG. 12A illustrates one embodiment of a top perspective view of a handle for the keyboard support wherein the keyboard support is attached to a pivoting holder.
Figure 12B:
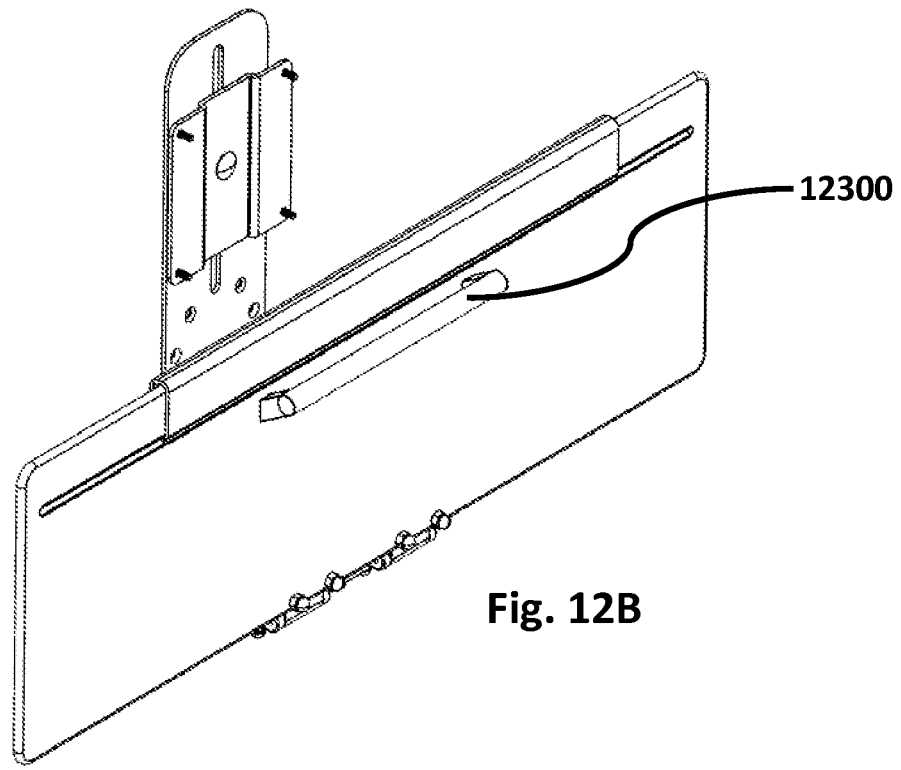
FIG. 12B illustrates the keyboard support of FIG. 12A with the keyboard support in the stowed position.

FIGS. 12A and 12B illustrate one embodiment for mounting the base to a combined folding keyboard and display mount 12000. Specifically, mount 12000 includes an L-shaped arm 12002, wherein the top area of arm 12002 includes a plate 12010 for mounting a display or monitor and wherein plate 12010 is height adjustable. The bottom end of 12002 includes hinges 12020 and 12022 that are securely attached to base 12100 of the keyboard support. Here, hinges 12020 and 12022 have a stop that prevents them from extending more than 180°. Specifically, the range of motion for hinges 12020 and 12022 are limited to zero degrees (fully closed position) up to approximately 180° (fully open position). However, it is contemplated within the scope of the invention that the hinges can stop at any degree or angle. Further, it is contemplated within the scope of the invention that any type of hinge or component may be used that would allow the base to rotate relate to a mount, including but not limited to: butt hinge, butterfly hinge, flush hinge, piano hinge, concealed hinge, hospital hinge, industrial hinge, ball and joint hinge, latch hinge, spring loaded hinge, weld hinge, and weld-on hinge. Here, hinges 12020 and 12022 allow the keyboard support on the tray and base to be folded upward 90°, thereby stowing the keyboard when not in use. Referring to FIG. 12B, one embodiment for a handle 12300 is also illustrated. Here, handle 12300 extends at a slight downward angle from the underside surface of the base, wherein the handle is hidden from view when the base and tray are viewed from the top. Further, handle 12300 can be secured to the base via one or more screws, bolts, nuts, rivets, press-fit, snap-fit, press-fit, adhesives, welds, or solder. Here, mount 12000 can be mounted via one or more of a clamp mount, through desk mount, wall mount, wall track mount, pole mount, or dual pole mount.

Figure 13A:
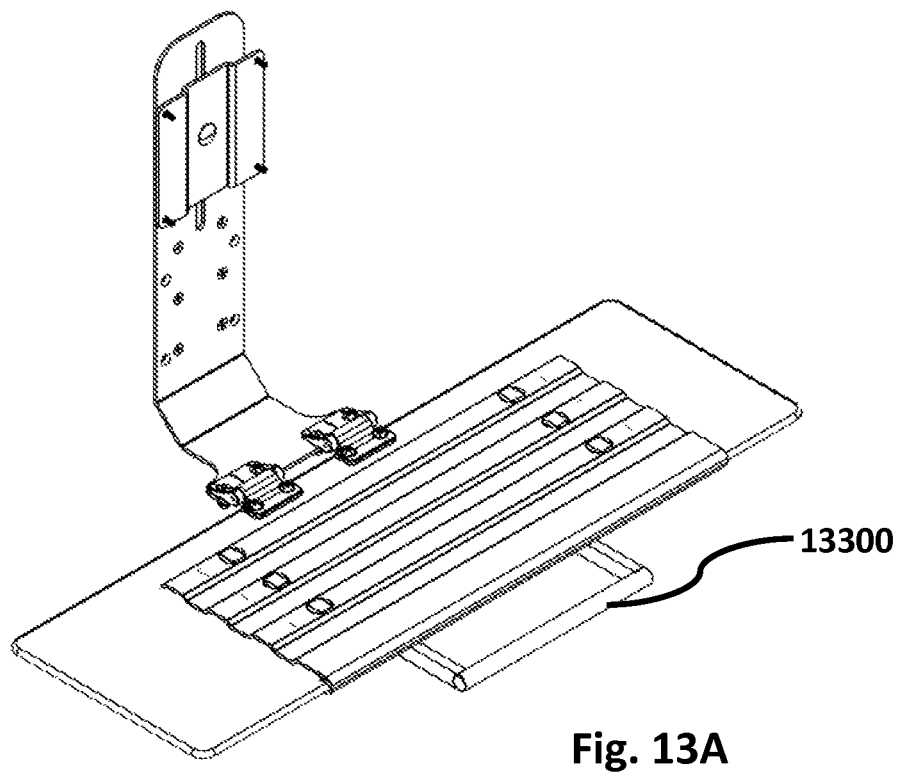
FIG. 13A illustrates a top perspective view of another embodiment of a handle for the keyboard support wherein the keyboard support is attached to a pivoting holder.
Figure 13B:
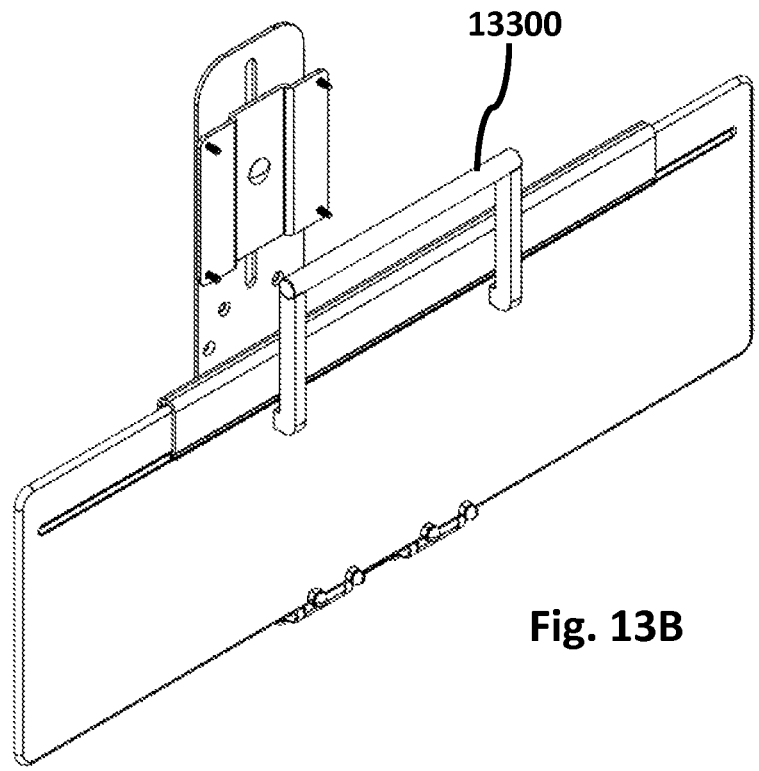
FIG. 13B illustrates the keyboard support of FIG. 13A with the keyboard support in the stowed position.

FIG. 13A illustrate another embodiment for a handle assembly. In this embodiment, handle 13300 extends from underside surface of the base while being substantially parallel with the base. Here, handle 13300 extends past the ledge of the base and keyboard tray, wherein the handle can be viewed when the base and tray are viewed from the top.

Figure 14A:
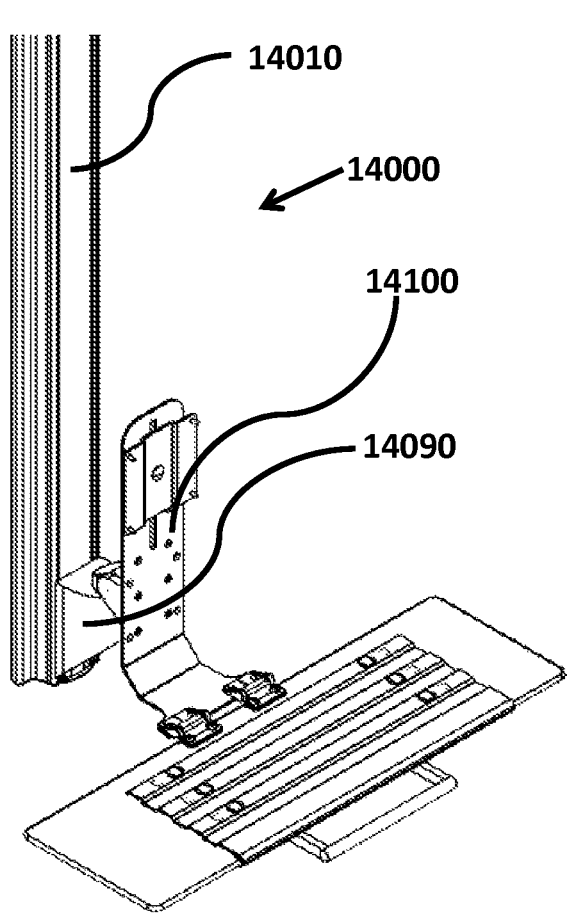
FIG. 14A illustrates a top perspective view of another embodiment of the keyboard support mounted on an adjustable and sliding rail assembly.
Figure 14B:
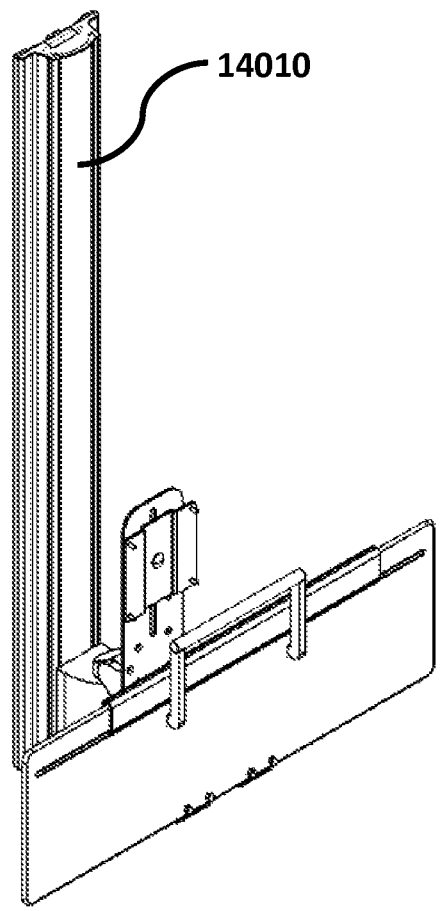
FIG. 14B illustrates the keyboard support of FIG. 14A with the keyboard support in the stowed position.

FIGS. 14A and 14B illustrate one embodiment for mounting the keyboard support of the invention to a height adjustable assembly. Specifically, assembly 14000 can be mounted on a wall, and is comprised of mount 14100 that is mounted on to plate 14090 that is further mounted to a rail or track assembly 14010. Plate 14090 can slide vertically upward or downward within track 14010, thereby allowing a user to adjust the height of the keyboard and display mount. In another embodiment, the keyboard and display mount can be mounted on a horizontal rail or track assembly (not shown), thereby allowing a user to adjust the position of the keyboard and display in a horizontal plane. It is contemplated within the scope of the invention that assembly 140000 can either be a fixed wall mount or sliding/track wall mount.

Figure 15A:
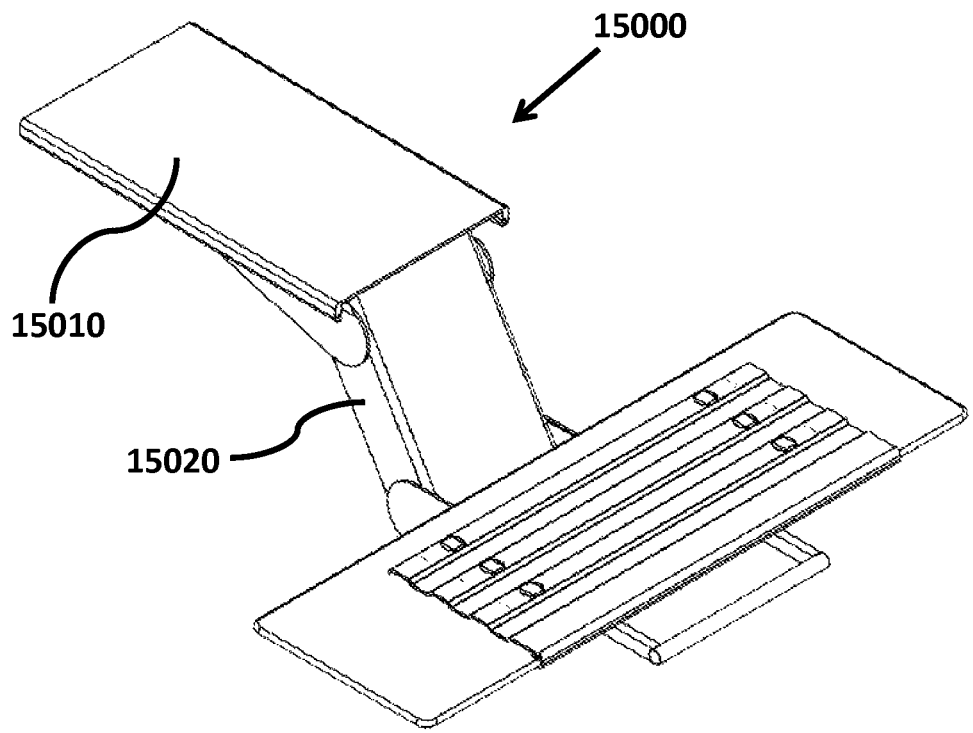
FIG. 15A illustrates a top perspective view of another embodiment for the keyboard support mounted on an articulating assembly.
Figure 15B:
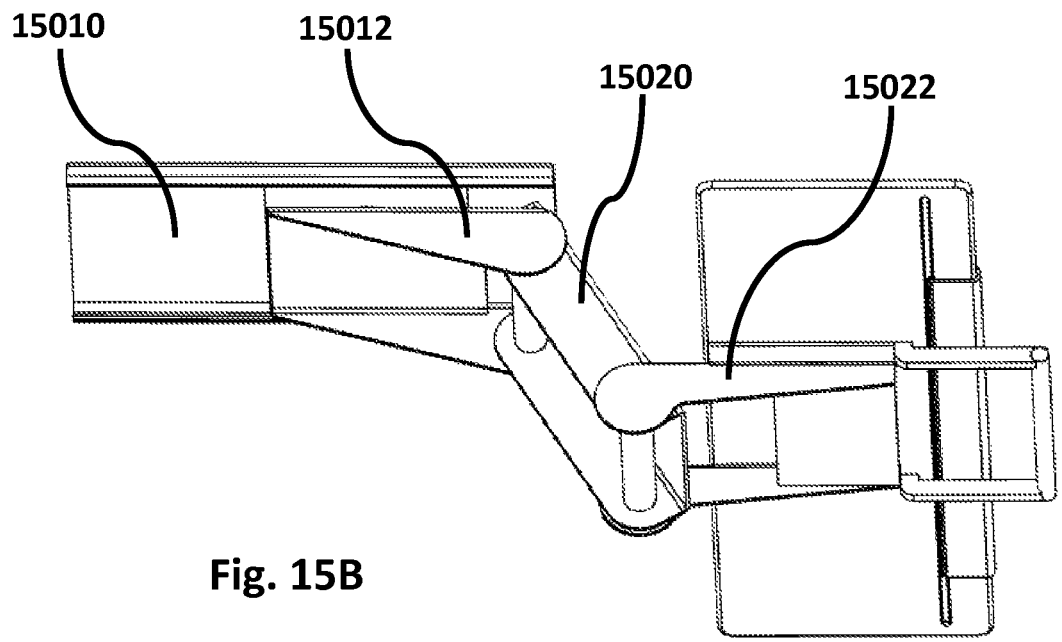
FIG. 15B illustrates a bottom perspective view of the keyboard support of FIG. 15A.

FIGS. 15A and 15B illustrate another embodiment for mounting the keyboard support of the invention to an articulating mount. In this embodiment, articulating mount 15000 includes a frame 15010, attached to frame 15010 is bracket 15012, attached to bracket 15012 is a first arm 15020, and attached to first arm 15020 is a second arm 15022, wherein the second arm 15022 is securely attached to the base component the keyboard support. Here, the keyboard support can tilt, articulate, and move upward, downward, inward, or outward via the linkage of parts 15010, 15012, 15020, 15020, and 15022. It is contemplated within the scope of the invention that the base component of the keyboard support may be coupled to arm 15022 via one or more screws, bolts, nuts, rivets, press-fit, snap-fit, press-fit, adhesives, welds, or solder. Here, mount 15000 can be mounted via fasteners, such as bolts, rivets, screws, welds, etc., that affix the mount to an underside area of a work surface.

Figure 16A:
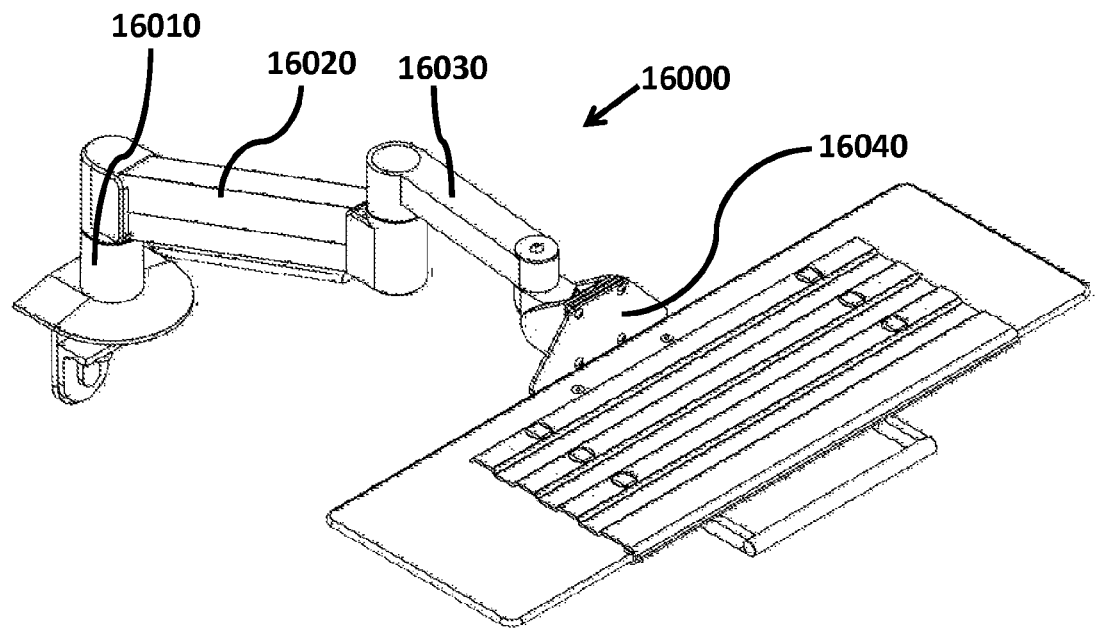
FIG. 16A illustrates a top perspective view of another embodiment of the keyboard support mounted on an articulating assembly.
Figure 16B:
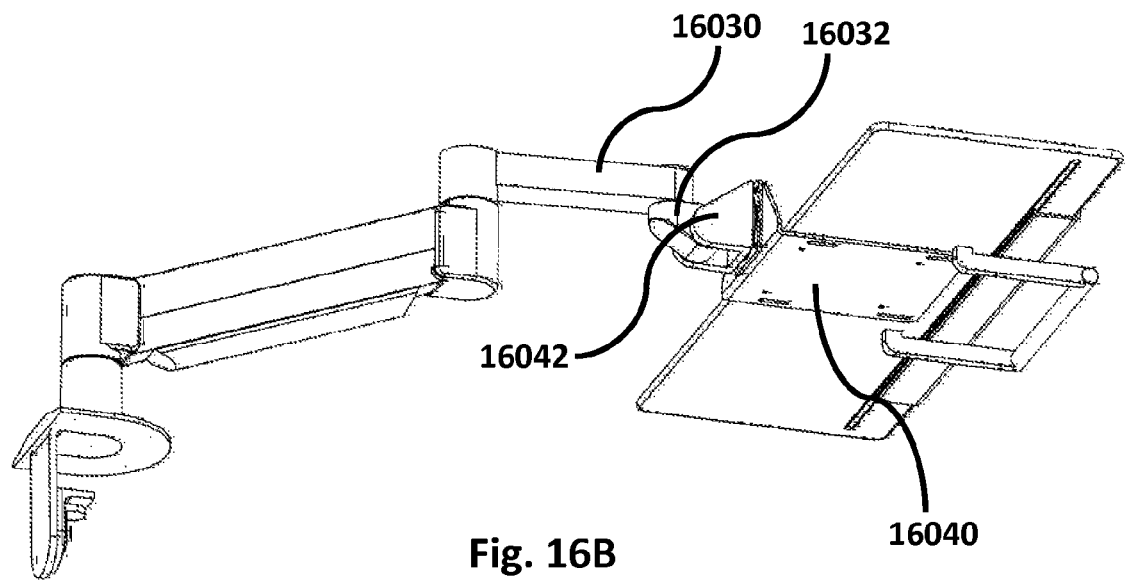
FIG. 16B illustrates a bottom perspective view of the keyboard support of FIG. 16A.

FIGS. 16A and 16B illustrate another embodiment for mounting the keyboard support of the invention to an articulating mount. In this embodiment, articulating mount 16000 includes bracket 16010, which is attached to arm 16020, wherein arm 16020 can pivot about an axis. Here, bracket 16010 can have a mounting plate and/or bracket assembly. Further, arm 16030 is attached to arm 16020, wherein arm 16030 can pivot about an axis. In addition, arm 16030 is further pivotally attached to bracket 16032, bracket 16032 is pivotally attached to bracket 16042, and bracket 16042 is attached to plate 16040, wherein plate 16040 is further secured to the keyboard support apparatus of the invention. Here, the keyboard support can tilt, pivot, articulate, and be adjusted upward, downward, inward, downward, sideways, or laterally via the linkage of parts 16010, 16020, 16030, 16032, 16042, and 16040. It is contemplated within the scope of the invention that the base component of the keyboard support may be coupled to plate 16040 via one or more screws, bolts, nuts, rivets, press-fit, snap-fit, press-fit, adhesives, welds, or solder. Here, mount 16000 can be mounted via one or more of a clamp mount, through desk mount, wall mount, wall track mount, pole mount, or dual pole mount.

It will be apparent to those skilled in the art that various modifications and variations can be made in the disclosed keyboard support apparatus. For example, the base and tray can be mounted to one or more affixed assemblies, wherein the base and tray can be either fixed or pivoting with respect to the assemblies. In addition, the base or tray, or both, can include any number of accessories or attachments. For example, the base or tray, or both, can include one or more attached pockets or holders for holding one or more computer mice or related devices. Further, In addition, the base or tray, or both, may further include stops or raised walls around their perimeter to keep a computer mouse or keyboard from sliding off either the base or track. Also, either the tray or base, or both, can be mounted to a keyboard drawer glide assembly, wherein the keyboard drawer glide assembly is mounted to the underside area of a work surface, work station, or work desk. It will also be apparent to those skilled in the art that while the method of assembling a keyboard support apparatus is disclosed with a specific order, that specific order is not required. Other embodiments will be apparent to those skilled in the art from consideration of the specification and practice of the disclosed embodiments herein. It is intended that the specification and examples be considered as exemplary only, with a true scope of the disclosure being indicated by the following claims.

What is claimed is:

1. A user input device support apparatus, comprised of:
a base comprising a projection or a groove below the base, wherein the base is configured to couple to a mobile or fixed mounting apparatus;
a tray configured to support a user input device, wherein the tray extends over and around one side of the base, thereby engaging the projection or the groove below the base; and
wherein the tray has an axial orientation and is further configured to slide axially with respect to the base.

2. The user input device support apparatus of claim 1, wherein the input device is comprised of at least one or more of: a computer keyboard, computer mouse, musical sound keyboard, touch screen interface, stylus input interface, haptic input interface, motion tracking interface, and eye gaze interface.

3. The user input device support apparatus of claim 1, wherein the groove is an elongated channel.

4. The user input device support apparatus of claim 1, wherein the tray further comprises one or more ridges or corrugations.

5. The user input device support apparatus of claim 1, wherein the tray further comprises a securement apparatus configured to secure a keyboard to the tray.

6. The user input device support apparatus of claim 5, wherein the securement apparatus is comprised of at least one or more of: tabs, adhesives, bolts, hook and loop fasteners, press-fit fasteners, and snap-fit fasteners.

7. The user input device support apparatus of claim 5, wherein the securement apparatus comprises an elongated tab and a tab receiver for securing to a bottom of the keyboard, and further wherein the tab receiver is received through an opening in the tray, and further wherein the tab is received within the tab receiver, thereby securing the tab receiver to the tray.

8. The user input device support apparatus of claim 7, wherein the front end of the tab is at least partially configured in the shape of an arrow head and the tail end is at least partially flared.

9. The user input device support apparatus of claim 8, wherein the tab further comprises an elongated opening, wherein one surface of the tab comprises at least one protrusion at a front end, and at least one protrusion at a tail end.

10. The user input device support apparatus of claim 1, further comprising a slide assist agent, wherein the slide assist agent is configured to assist sliding of the tray with respect to the base.

11. The user input device support apparatus of claim 10, wherein one or more slide assist agents are disposed in between the tray and base.

12. The user input device support of claim 10, wherein the slide assist agent is comprised of at least one or more of: ultra-high-molecular-weight polyethylene (UHMW), high-modulus polyethylene (HMPE), high-performance polyethylene (HPPE), polycarbonate based material, polymer based material, polyethylene based material, bearings, ball bearings, roller bearings, magnetic bearings, rotary bearings, linear bearings, magnets, gears, spur gears, worm gears, helical gears, herringbone gears, bevel and miter gears, internal gears, rack and pinion, face gears, involute splines, straight solid splines, sprockets, grease, and oil based substances.

13. The user input device support apparatus of claim 1, wherein the tray further comprises a palm rest.

14. The user input device support apparatus of claim 1, further comprising a palm-rest secured to the tray.

15. The user input device support apparatus of claim 1, wherein the base can be pivotally mounted to at least one or more of: a bracket, a clamp mount, desk mount, wall mount, wall track mount, pole mount, dual pole mount, or drawer.

16. The user input device support apparatus of claim 1, wherein the base comprises one or more attachment points for mounting to at least one or more of: a bracket, a clamp mount, desk mount, wall mount, wall track mount, pole mount, dual pole mount, or drawer.

17. The user input device support apparatus of claim 1, wherein the tray and base are configured to detach and re-attach to each other.

18. A user input device support apparatus, comprised of:
a base configured to couple to a mounting apparatus, wherein the base comprises an elongated channel or an elongated projection underneath the base;
a tray configured to support user input device, wherein the tray extends over and around one side of the base, thereby engaging the elongated channel or the elongated projection underneath the base; and
wherein the tray is configured in a lateral orientation and further configured to slide laterally with respect to the base.

19. The user input device support apparatus of claim 18, wherein the input device is comprised of at least one or more of: a computer keyboard, computer mouse, musical sound keyboard, touch screen interface, stylus input interface, haptic input interface, motion tracking interface, and eye gaze interface.

20. A user input device support apparatus, comprised of:
a tray, wherein one end of the tray comprises a lip extending over and around one side of a base, wherein an interior region of the lip comprises an elongated groove or an elongated projection, and wherein the tray is configured to engage the base via the elongated groove or the elongated projection; and
wherein the tray is configured to be oriented laterally and slide laterally with respect to the base.

* * * * *